United States Patent
Subbarao et al.

(10) Patent No.: US 7,142,416 B2
(45) Date of Patent: Nov. 28, 2006

(54) METHOD AND APPARATUS FOR DETERMINING THE PHYSICAL CONFIGURATION OF A MULTI-COMPONENT SYSTEM

(75) Inventors: Kalpana Subbarao, Cypress, TX (US); Kevin J. Brusky, Houston, TX (US); John DeNardo, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/324,547

(22) Filed: Dec. 20, 2002

(65) Prior Publication Data

US 2004/0120105 A1 Jun. 24, 2004

(51) Int. Cl.
*G06F 1/16* (2006.01)
(52) U.S. Cl. .................................. 361/683; 361/679
(58) Field of Classification Search .............. 361/679, 361/683–686, 379
See application file for complete search history.

(56) References Cited

U.S. PATENT DOCUMENTS

| 5,956,665 | A | 9/1999 | Martinez et al. |
| 6,134,638 | A | 10/2000 | Olarig et al. |
| 6,173,422 | B1 | 1/2001 | Kimura et al. |
| 6,188,973 | B1 | 2/2001 | Martinez et al. |
| 6,411,506 | B1 * | 6/2002 | Hipp et al. ................. 361/686 |
| 6,664,978 | B1 | 12/2003 | Kekic et al. |
| 2003/0030978 | A1 * | 2/2003 | Garnett et al. |
| 2003/0069953 | A1 * | 4/2003 | Bottom et al. |

\* cited by examiner

*Primary Examiner*—Yean-Hsi Chang

(57) ABSTRACT

Embodiments of the invention may include a support structure which may contain a plurality of electrical components. A remote device may receive system data from at least one component in the support structure, which may comprise a rack. The remote device may process the system data to determine the physical arrangement of the electrical components within the support structure. Such physical arrangement information may be presented on a display at the remote device.

14 Claims, 10 Drawing Sheets

```
<RIMP>
    <HSI>
252 {       <SBSN>XXXX</SBSN>
            <SP>XXXX</SP>                                       250
    </HSI>
    <MP>
            <ST>XXXX</ST>
            <PN>XXXX</PN>
            <FWRI>XXXX</FWRI>
254 {       <HWRI>XXXX</HWRI>
            <SN>XXXX</SN>
            <SSO>XXXX</SSO>
            <STE>XXXX</STE>
            <CIMOM>XXXX</CIMOM>
            <USESTE>XXXX</USESTE>
    </MP>
256 { <RC>
            <DU>XXXX</DU>
            <IU>XXXX<IU>
    </RC>
    <INFRA>
            <RACK>XXXX</RACK>
            <ENCL>XXXX</ENCL>
            <ICMB_ADDR>XXXX<ICMB_ADDR/>
258 {       <ENCL_SN>XXXX</ENCL_SN>
            <BLADE CNT=1>
                    <SLOT>XXXX</SLOT>
                    <HMM>XXXX</HMM>
                    <WMM>XXXX</WMM>
                    <DMM>XXXX</DMM>
                    <BSN>XXXX</BSN>
            </BLADE>
    </INFRA>
    <RK_TPLGY CNT=3>                263
            <RUID>XXXXXX</RUID>
            <ICMB ADDR="0xAA55" MFG="232" PROD_ID="NNN" SER="123" NAME="Enclosure
      262 { Name">            268
                    <LEFT ADDR=/>
                    <RIGHT ADDR="0xAB66" SER="456"/>
            </ICMB>
            <ICMB ADDR="0xAA66" MFG="232" PROD_ID="NNN" SER="456" NAME="Enclosure
260 { 264 { Name">      272        270
                    <LEFT ADDR="0xAA55" SER="123"/>
                    <RIGHT ADDR="0xAC77" SER="678"/>
            </ICMB>                          274
            <ICMB ADDR="0xAA77" MFG="232" PROD_ID="NNN" SER="678" NAME="Enclosure
      266 { Name">         276
                    <LEFT ADDR="0xAB66" SER="456"/>
                    <RIGHT ADDR=/>
            </ICMB>                  278
    </RK_TPLGY>                              FIG.5
</RIMP>
```

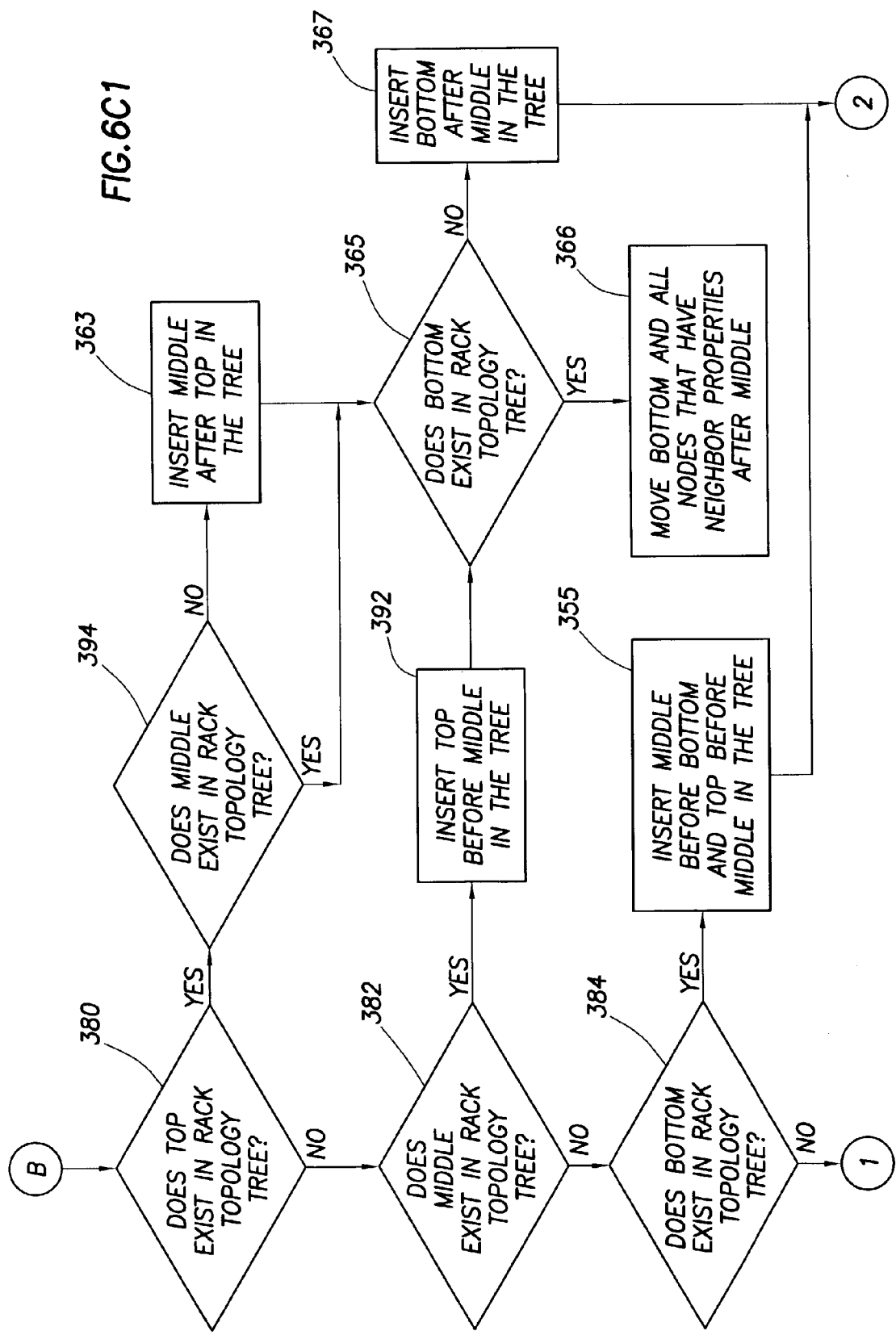

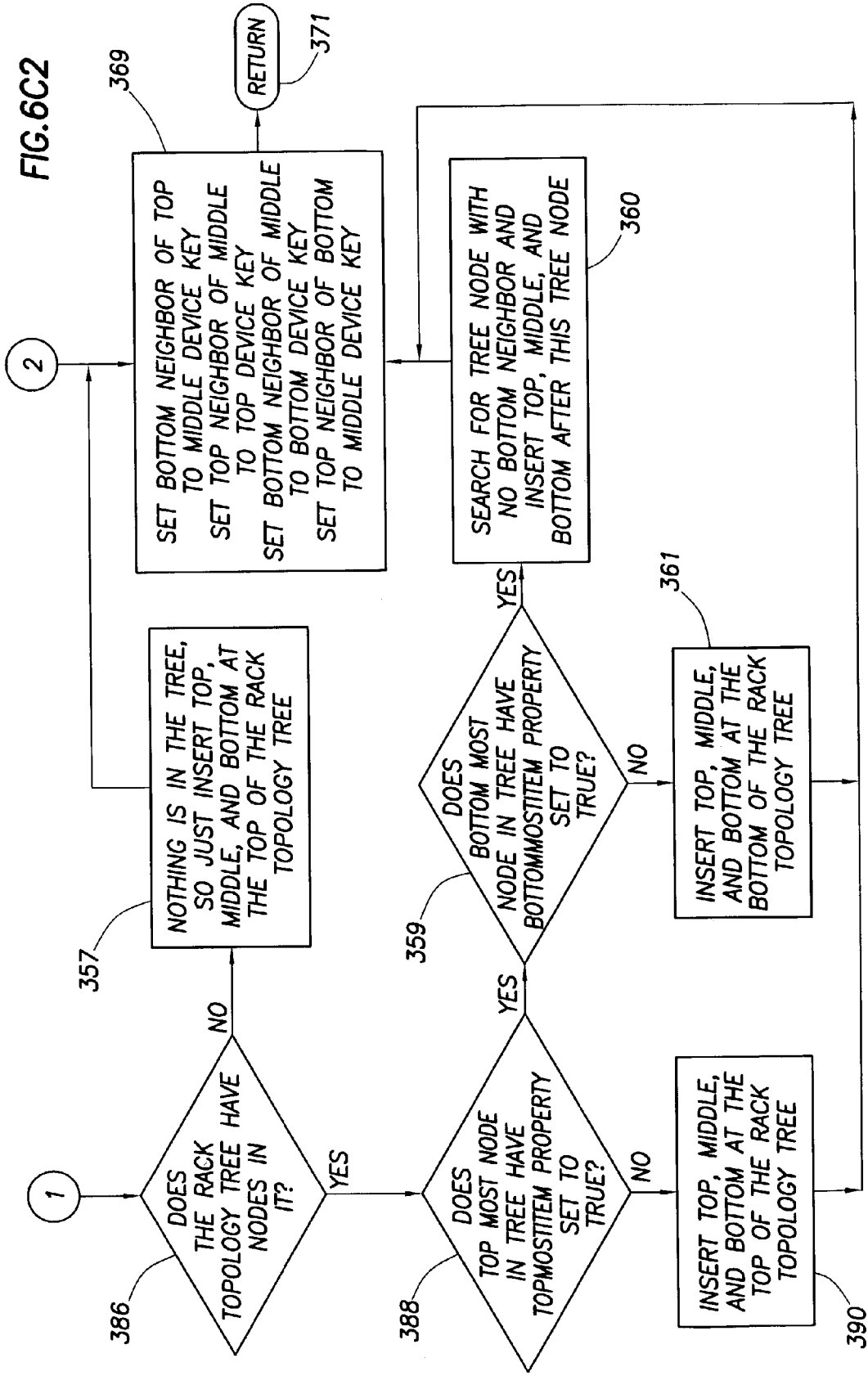

METHOD AND APPARATUS FOR DETERMINING THE PHYSICAL CONFIGURATION OF A MULTI-COMPONENT SYSTEM

BACKGROUND

1. Field of the Technology

This disclosure generally relates to methods and apparatus for determining the physical arrangement of multiple components in an electronic system.

2. Background Information

Electronic systems may comprise multiple electronic components coupled together. One type of electronic system is a computer system. For ease in explanation, much of the following disclosure pertains to computer systems. However, this disclosure, including the claims, should not be construed as limited to computer systems unless otherwise stated. The disclosure pertains broadly to numerous types of electronic systems.

A computer system may comprise a plurality of individual computers and computer-related components coupled together. Some computer systems may be implemented in the form of a support structure, such as a rack, to which various computers and related components mount or otherwise couple. Of course, the number of components in the rack may vary depending on the computing needs of the person or organization that operates the system. A rack containing dozens of computers, power supplies, and the like is not uncommon.

In some systems, a user can access the system via a remote console located apart from the rack. In this context, the user may not be able to actually see the rack and the equipment contained therein. The user, however, may desire to know the physical configuration of the rack, for example, which components are contained in the rack, specifically where those components reside within the rack, whether the rack has any capacity to accept additional components, etc. The disclosed subject matter may address one or more of the above issues.

BRIEF SUMMARY OF EMBODIMENTS OF THE INVENTION

Embodiments of the invention may include a support structure which may contain a plurality of electrical components. A remote device may receive system data from at least one component in the support structure. The remote device may process the system data to determine the physical arrangement (i.e., absolute location) of the electrical components within the support structure.

BRIEF DESCRIPTION OF THE DRAWINGS

For a detailed description of embodiments of the invention, reference will now be made to the accompanying drawings in which:

FIG. 5 provides an exemplary embodiment of how system data may be provided to the remote device in accordance with embodiments of the invention;

NOTATION AND NOMENCLATURE

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections. The terms "physical configuration," "physical arrangement," "topology," "topology tree," and "tree" refer to the physical orientation of components housed within a support structure. The term "system data" refers to data that includes, or is otherwise indicative of, the physical configuration or arrangement of components in a support structure. The term "server" generally refers to a computer that performs actions as a result of receiving requests from another entity, such as a client computer.

Certain terms are used throughout the following description and claims to refer to particular system components. As one skilled in the art will appreciate, different organizations may refer to a component by different names. This document does not intend to distinguish between components that differ in name but not function.

DETAILED DESCRIPTION OF EMBODIMENTS OF THE INVENTION

The following discussion is directed to various embodiments of the invention. Although one or more of these embodiments may be preferred, the embodiments disclosed should not be interpreted or otherwise used as limiting the scope of the disclosure, including the claims, unless otherwise specified. In addition, one skilled in the art will understand that the following description has broad application, and the discussion of any embodiment is meant only to be exemplary, and not intended to intimate that the scope of the disclosure, including the claims, is limited to these embodiments.

The embodiments of the invention provide a mechanism by which information may be collected from a plurality of electrical components contained in, or otherwise coupled to, a support structure. In some embodiments, the electrical components collectively may comprise a computer system and, as such, may include computers (e.g., server computers), as well as power supplies, switches, ports, and other computer-related components. The support structure may comprise a rack in which the components are mounted. In the embodiment described below, one or more enclosures (also called "chassis" in this disclosure) are mountable in a rack. Each enclosure may accommodate one or more electrical components.

Figure 1:
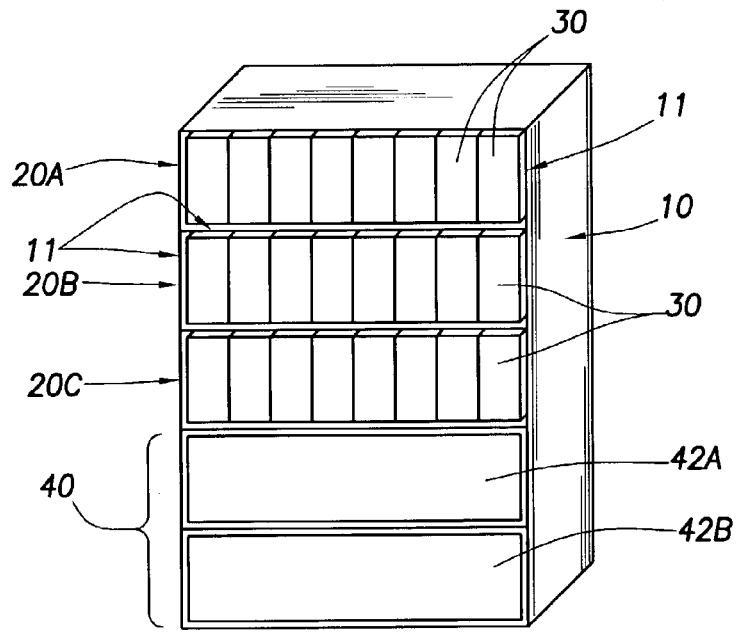
FIG. 1 illustrates a perspective view of a system comprising a support structure having multiple enclosures in accordance with embodiments of the invention.

Referring now to FIG. 1, a rack 10 is shown. The rack 10 may comprise a plurality of structural members 11 which form a frame for the rack. Further still, the rack 10 may be floor mounted or be portable (i.e., including wheels for mobility). In general, the rack may be any type of structure into which electrical components and their enclosures may be mounted or otherwise coupled. It should also be understood that the enclosures mentioned above are not required; that is, the electrical components may be mounted in the rack without the use of enclosures, if desired.

Referring still to the exemplary rack 10 of FIG. 1, the rack may include provisions to accommodate five chassis 20A, 20B, 20C, 42A and 42B. The size of the rack and the number of chassis may be altered as desired. This disclosure is in no way limited to any particular rack size or shape, number of enclosures, or number of electrical components contained in the enclosures and/or rack. The chassis 20, 42 may be adapted to slide into the rack 10 along guide rails (not specifically shown), although other attachment mechanisms may be used. Individual electrical components (e.g., servers) may be mounted in the rack 10 by insertion of such devices into an enclosure 20, 42 and then insertion of the enclosure 20, 42 into the rack 10. Some, or all, of the components 30 contained in an enclosure 20 may comprise server computers ("servers"). The enclosures 20A–C may be adapted to hold one or more servers 30 in a vertical position as shown, although other orientations (e.g., horizontal) are possible. Further, as explained below, each enclosure 20, 42 also may be adapted to hold one or more communication modules which couple to the components in that enclosure and may permit the components to communicate with components in other enclosures in the rack.

If desired, the servers 30 may be implemented without including an AC-to-DC power supply in each server. An AC-to-DC power supply receives AC input voltage and converts that voltage to a DC voltage suitable for use by the server's electronics (e.g., 3.3 VDC, etc.). Rather, and still referring to FIG. 1, direct current (DC) power may be supplied for each server 30 in the rack 10 from a power supply system 40. As illustrated in FIG. 3, the power supply system 40 may comprise two power supply enclosures 42A and 42B. Each enclosure 42A, 42B includes one or more power supplies 44 (FIG. 2) which convert AC voltage to DC voltage at a level suitable for use by the servers 30. The number of power supplies 44 and enclosures 42 required for any particular server system 100 may depend on the number of chassis 20, the number of servers 30 within those chassis, and the average and peak power demand of the devices in enclosures 20.

Figure 2:
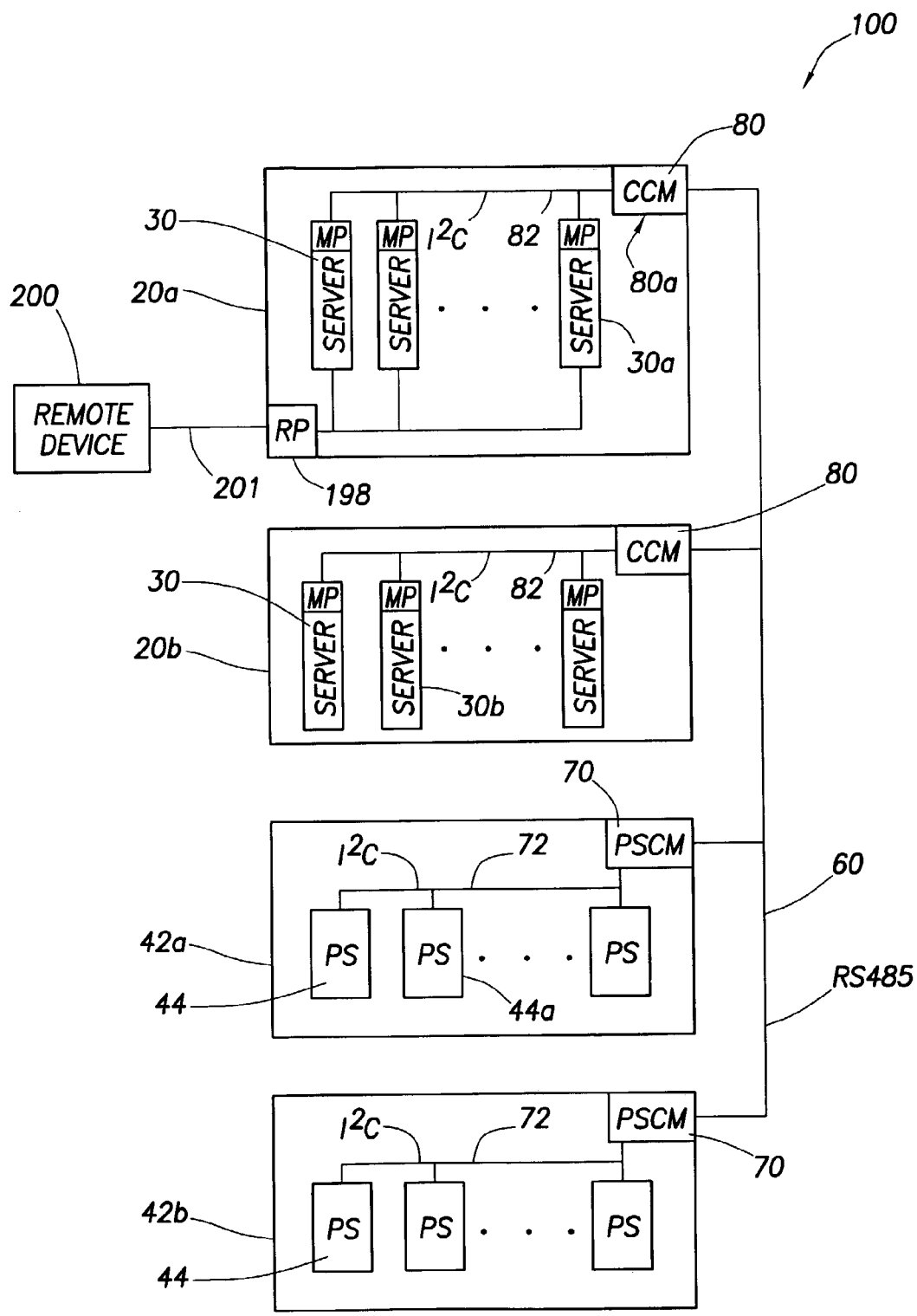
FIG. 2 shows an electrical block diagram of the system of FIG. 1 in accordance with embodiments of the invention.
Figure 3:
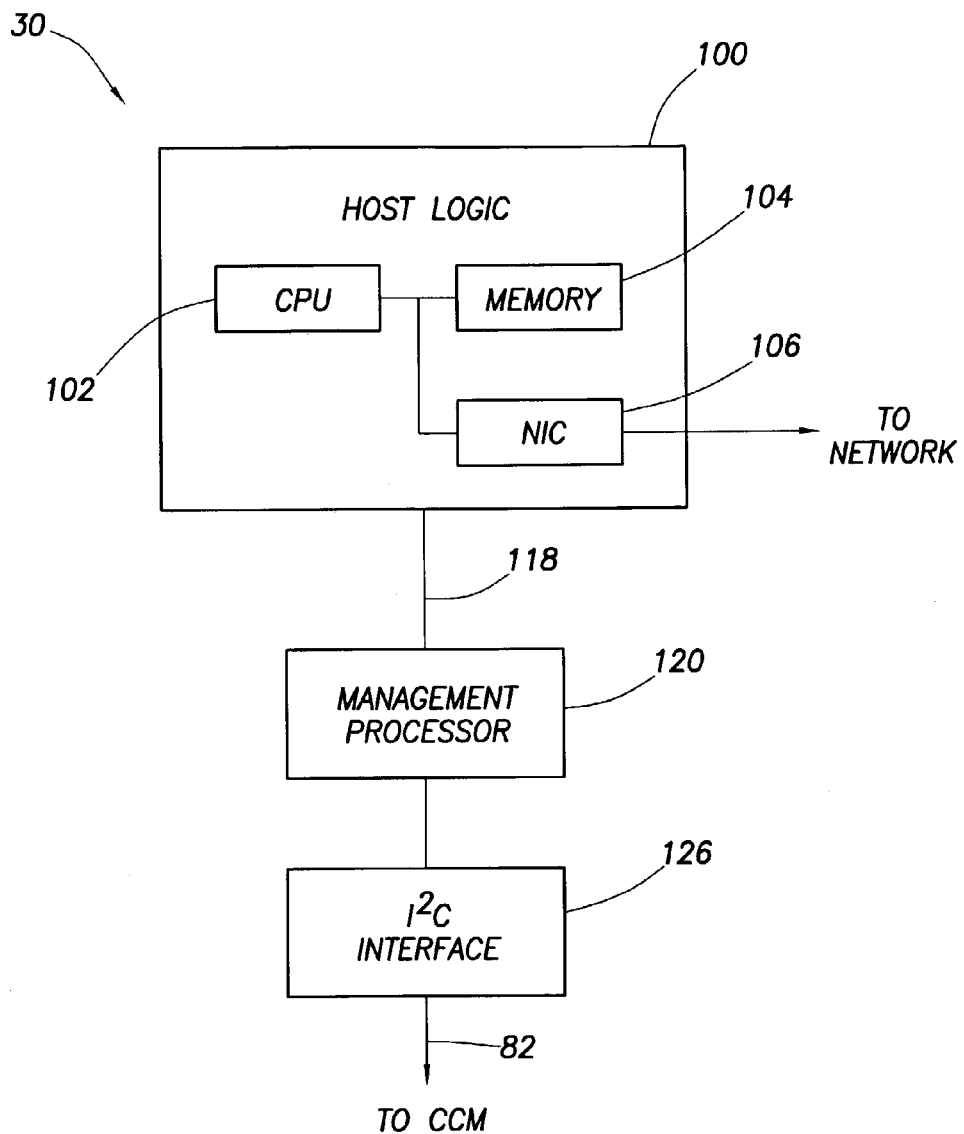
FIG. 3 provides a block diagram of a component (e.g., a server) included in the system in accordance with embodiments of the invention.

Referring now to FIG. 2, the rack's components may be coupled together to form a system 100. The example of FIG. 2 includes two enclosures 20 (20a and 20b) and two enclosures 42 (42a and 42b). A communication pathway 60 couples together each of the power supply enclosures 42 and enclosures 20. The communication pathway 60 may comprise a serial link such as an Institute of Electrical and Electronic Engineers (IEEE) RS-485 compliant link. However, while an RS-485 link is acceptable, communication between the power supply enclosures 42 and the server enclosures 20 may take place using any suitable serial or parallel communication bus and protocol.

Although it is acceptable to have each server 30 and each power supply 44 in the system communicate over the serial communication pathway 60, other configurations are possible. In some embodiments as noted above, each enclosure 20, 42 may include a communication module 70, 80 which interfaces the various servers and power supply devices in the respective enclosures to the RS-485 communication pathway 60 and thus to other enclosures. Referring still to FIG. 2, each of the power system enclosures 42a,b and each of the server enclosures 20a,b may have a communication module that is responsible for relaying messages to the serial communication pathway 60. As shown in the example of FIG. 2, each power system enclosure 42a,b includes a power supply communication module 70 (PSCM), while each server chassis 20a,b includes a chassis communication module (CCM) 80. The CCM 80 may communicate with each server 30 within its particular chassis 20, and may relay messages to and from the serial communication pathway 60. The CCM 80 may also communicate with each individual server 30 within its chassis 20 over a communication pathway 82. The communication pathway 82 may comprise an I$^2$C bus, although other forms of communication are acceptable as well. Information regarding the I$^2$C bus may be found in "The I$^2$C-Bus Specification," Version 2.1 (January 2000), authored by Philips Semiconductors® and incorporated herein by reference. Power supplies 44 also communicate with their associated PSCM 70 via an I$^2$C bus 72, although other communication links may be used as well.

Referring still to FIG. 2, a remote device 200 may couple to the system via a remote port 198 and communication pathway 201. The remote device 200 may be used to determine the physical configuration of components (servers, enclosures, etc.) in the support structure (rack) and display such physical configuration information on the remote device 200. The term "remote" should be not be interpreted as suggesting anything about the distance between the remote device and the rack. The remote device 200 may be located adjacent the rack 10, in another room, or outside the building in which the rack is located. The communication link 201 between the remote device 200 and the remote port 198 may include any type of communication link desired. The link may comprise, for example, various forms of connectivity usable in Internet communications. Although only one enclosure 20 is shown as having a remote port 198, any or all of the enclosures 20, 42 may include a remote port. As such, the remote device 200 may communicate with any one or more or all of the enclosures.

FIG. 3 illustrates an embodiment of a server 30. As shown, the server 30 may include host logic 100, a management processor 120 and an I$^2$C interface 126. The host logic 100 may include a central processing unit (CPU) 102, a memory 104 and a network interface controller 106 coupled together. Executable code may be stored in memory 104, or elsewhere in the host logic, and may be executed by host CPU 102. Broadly, the host logic 100 may include the components shown in FIG. 3 and/or other components as may be desired.

The host logic 100 couples to the management processor 120 via a bus 118. Bus 118 may comprise a peripheral component interconnect (PCI) bus or other bus as desired. The management processor 120 may include its own executable code. The interface to the CCM 80 in the enclosure containing the server 30 may be via the I$^2$C interface 126. The PSCM 70 may have the same or similar block diagram as that shown in FIG. 3.

Figure 4:
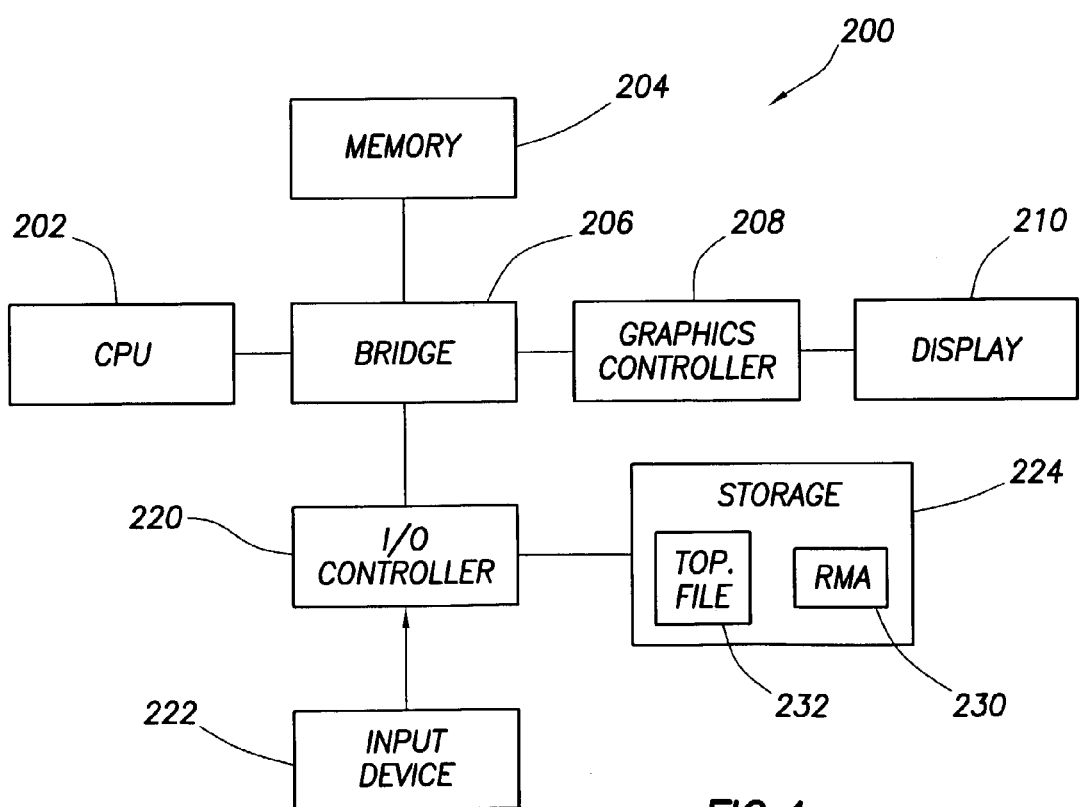
FIG. 4 illustrates a block diagram of a remote device adapted to couple to the system in accordance with embodiments of the invention.

FIG. 4 illustrates an embodiment of the remote device 200. The device may include a CPU 202, memory 204, bridge logic 206, a graphics controller 208, a display 210, an input/output controller 220, an input device 222 and a storage device 224. The remote device 200 may be a computer or other type of interactive electronic device. FIG. 4 shows an exemplary configuration of the components comprising remote device 200, and the device 200 may comprise numerous other configurations. As shown, the CPU 202, memory 204, graphics controller 208 and I/O controller 220 couple to the bridge logic 206. Images (e.g., graphics, text) are provided to display 210 by way of the graphics controller 208. Via the input device 222 (which may comprise a keyboard, mouse, trackball, etc.), a user can interact with the remote device 200. Input signals from the input device 222 may be provided to the CPU 202 via the I/O controller 220.

The storage device 224 may comprise a hard disk drive or other type of storage medium. The storage device 224 may include one or more applications that are executable by the CPU 202. At least one such application is the remote management application (RMA) 230, which implements some, or all, of the functionality described below. The storage device 224 may also contain a topology file 232.

Referring to FIGS. 2 and 4, the remote device 200 receives "system data" from the system 100. In general, system data refers to data that includes, or is otherwise indicative of, the physical configuration of the components in the rack 10. The remote device preferably analyzes, interprets or otherwise processes the system data to determine the physical configuration of the components in the system 100. The remote device 200 may also display the physical configuration if desired. The physical configuration of the system's components refers to any one or more of the following examples (the list is non-exhaustive):

(1) determining the number of enclosures in the rack;
(2) determining the relative placement of the enclosures in the rack (e.g., determining which enclosure is in the top most location in the rack, determining which enclosure is immediately below the top most enclosure, and so on);
(3) determining excess rack capacity to accommodate additional components;
(4) determining the number of electrical components within each enclosure; and
(5) determining the status of the electrical components within each enclosure. As noted above, this list is not intended to be exhaustive. As one skilled in the art will appreciate, other data may be provided to indicate the configuration of the system.

The process of determining the physical configuration of the system 100 includes providing system data to the remote device 200 and processing such data. FIG. 5, which will be described below, illustrates an exemplary embodiment of the type of system data that is provided by the system 100 to the remote device 200 and an exemplary format for such data. The remote device 200 may access each management processor 120 in the system 100 for the system data. The remote device 200 may contain or otherwise have access to a file (not specifically shown) containing a list of the management processors present in the system (identified, for example, by an identifier such as an Internet Protocol (IP) address). The remote device 200 may poll each management processor in the system for system data that management processor 120 may contain or have access to.

FIG. 5 shows an exemplary eXtended Markup Language (XML) listing 250 of system data that a management processor 120 may provide to the remote device 200. Various acronyms are used in FIG. 5 and their definition is provided below:

| | |
|---|---|
| RIMP | Remote Insight Management Processor |
| HIS | Host Server Information |
| MP | Management Processor |
| RC | Remote Console |
| SBSN | System Board Serial Number |
| SP | Server Power |
| POS | Power On Server |
| ST | Status |
| PN | Product Name |
| FWRI | Firmware Revision Information |
| HWRI | Hardware Revision Information |
| SN | Serial Number |
| SSO | Single Sign-On |
| STE | Secure Task Execution |
| DU | Default URL |
| USESTE | Use Secure Task Execution |
| INFRA | Information related to the Infrastructure or Rack |
| RACK | Name of the Rack |
| ENCL | Name of the Enclosure |
| ICMB_ADDR | ICMB address of the Enclosure in which this server resides |
| ENCL_SN | Serial Number of the enclosure |
| SLOT | Slot number that the blade occupies |
| HMM | Height of the blade (millimeters) |
| WMM | Width of the blade (millimeters) |
| DMM | Depth of the blade (millimeters) |
| RK_TPLGY | The network topology of the enclosures |
| RUID | Rack Unique Identifier |
| MFG | Manufacturer of the hardware component |
| PROD_ID | Product type code of the hardware |
| RIGHT | Hardware component to the top |
| LEFT | Hardware component to the bottom |

The listing 250 may comprise segments 252, 254, 256, 258, and 260. Segment 252 may include host server information (HSI) of the server containing the management processor 120. The HSI may include a system board serial number (SBSN) and server power information (SP).

Segment 254 may include system data concerning the management processor (MP). In general, the management processor-related system data includes information specific to the management processor. Such information may include any one or more of the following as shown in the example of FIG. 5: status (ST), a product name (PN), firmware revision information (FWRI), hardware revision information (HWRI), serial number (SN), single sign-on (SSO), secure task execution (STE), common interface model (CI-MOM), and use STE (USESTE).

Referring still to FIG. 5, segment 256 may include remote console (RC) data. The remote console refers to the remote device 200 (FIG. 2). This information may include a default uniform resource locator (URL) identified in segment 256 as DU. This URL may be the URL of, or associated with, the remote device 200. The RC data may also include an image URL (IU) which may also pertain to the remote device 200.

Segment 258 may include system infrastructure data (INFRA). The INFRA data may include a rack identifier (RACK) which may comprise an alphanumeric name, and enclosure identifier (ENCL) which also may comprise an alphanumeric name, an address of the enclosure in which the associated server resides (ICMB_ADDR), and enclosure serial number (ENCL_SN), and server location and size information (BLADE CNT). This latter system data may include an identification of the slot (SLOT) that is occupied by the server and the height (HMM), width (WMM), and depth (DMM) (measured, for example, in units of millimeters) of the enclosure. The BLADE CNT may also include BSN which refers to the blade serial number.

Segment 260 may include information about the topology of the enclosures in the rack (RK_TPLGY). As shown in the exemplary rack configuration of FIG. 1, three server enclosures 20A–C are shown occupying the top three locations in the rack and two power supply enclosures 42A–B are shown in the bottom two rack locations. Each enclosure 20, 42 in FIG. 1 has at least one adjacent neighboring enclosure. The middle three enclosures 20B, 20C and 42A have top and bottom neighbors. For example, enclosure 20B has a top neighbor 20A and a bottom neighbor 20C. The top most enclosure 20A in the rack only has a bottom neighbor (20B) and the bottom most enclosure 42B only has a top neighbor (42A). The rack 10 in FIG. 1 is shown with a full allotment of enclosures. Alternatively, one or more of the locations in which an enclosure could be placed may remain empty. In that case, a rack enclosure may not have any neighboring enclosures. For example, if power supply enclosure 42A was not present, power supply enclosure 42B would not have a neighbor.

Referring again to FIG. 5, segment 260 provides topology information about one or more enclosures in the rack. In accordance with embodiments of the invention, each management processor 120 accessed by the remote device 200 may have topology information regarding the enclosure in which the management processor resides, as well as topology information from the neighboring enclosure(s), if any. Such information may be determined during initialization of each component or otherwise programmed into the components. Segment 260 of FIG. 5 includes topology information about the management processor's enclosure in subsegment 262. Subsegment 262 includes an identification of neighboring enclosures relative the management processor identified at address 263 (which is the management processor that provided the XML listing 250 to the remote device). This subsegment includes a "left" enclosure identifier 268 and a "right" enclosure identifier 270. With regard to example of FIG. 1 in which the enclosures are located in the rack in a vertical fashion, "left" refers to the neighboring enclosure above the enclosure in question and "right" refers to the neighboring enclosure below the enclosure in question. Topology information form the left and right enclosures may be provided from those enclosures'CCMs via the communication link 60. Topology information regarding the left and right enclosures may be stored in the enclosures'CCMs or my be obtained the CCMs from one or more management processors 120 in the enclosures.

In subsegment 262, the enclosure that contains the management processor 120 which provides the XML listing 250 to the remote device 200 is identified by the ICMB ADDR "0xAA55." As shown in FIG. 5, that enclosure does not have a left (top) neighbor (indicated by a "null" character which may comprise the character "/"), but does have a right (bottom) neighbor having an ICMB ADDR of "0xAB66." This topology information indicates that the enclosure having an address of 0xAA55 represents the top most enclosure in the rack and that the enclosure immediately below has an address of 0xAB66.

The topology of the right enclosure (e.g., which other enclosures are adjacent that enclosure) is included in subsegment 264. The right enclosure itself has a left (top) enclosure identified at 272 and a right (bottom) enclosure identified at 274. The left enclosure is identified as having an address of 0xAB66. This address naturally matches the address of the enclosure whose topology is provided in subsegment 262. The right enclosure identified in subsegment 264 at 274 has an address of 0xAC77. Based on the topology information provided in subsegments 262 and 264, the remote device 200 can determine that the top most three enclosures in the rack from top down have ICBM ADDRs of 0xAA55, 0xAB66, and 0xAC77, respectively.

The third subsegment 266 in FIG. 5 includes topology information about enclosure 0xAC77. As can be seen, the topology information reveals that the AC77's left neighbor (identified at 276) is an enclosure having the address 0xAB66 (which was described in subsegment 264). Further, enclosure 0xAC77 has no right (bottom) neighbor (indicated by the character "/") at 276. The system data provided by a single management processor may not necessarily contain sufficient information from which the physical configuration of the entire rack can be determined. A complete view of the rack may be obtained in some embodiments by accessing multiple management processors in one or more of the various enclosures. If desired, one or more or all of the management processors 120 in the rack may be accessed in this regard.

Figure 6C:
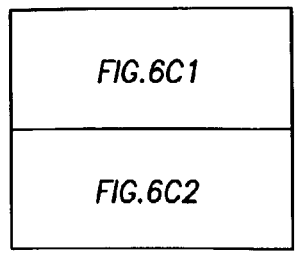
FIGS. 6A–6C include a flow chart illustrating how the system data may be analyzed by the remote device to determine the physical configuration of the system in accordance with embodiments of the invention.
Figure 6A:
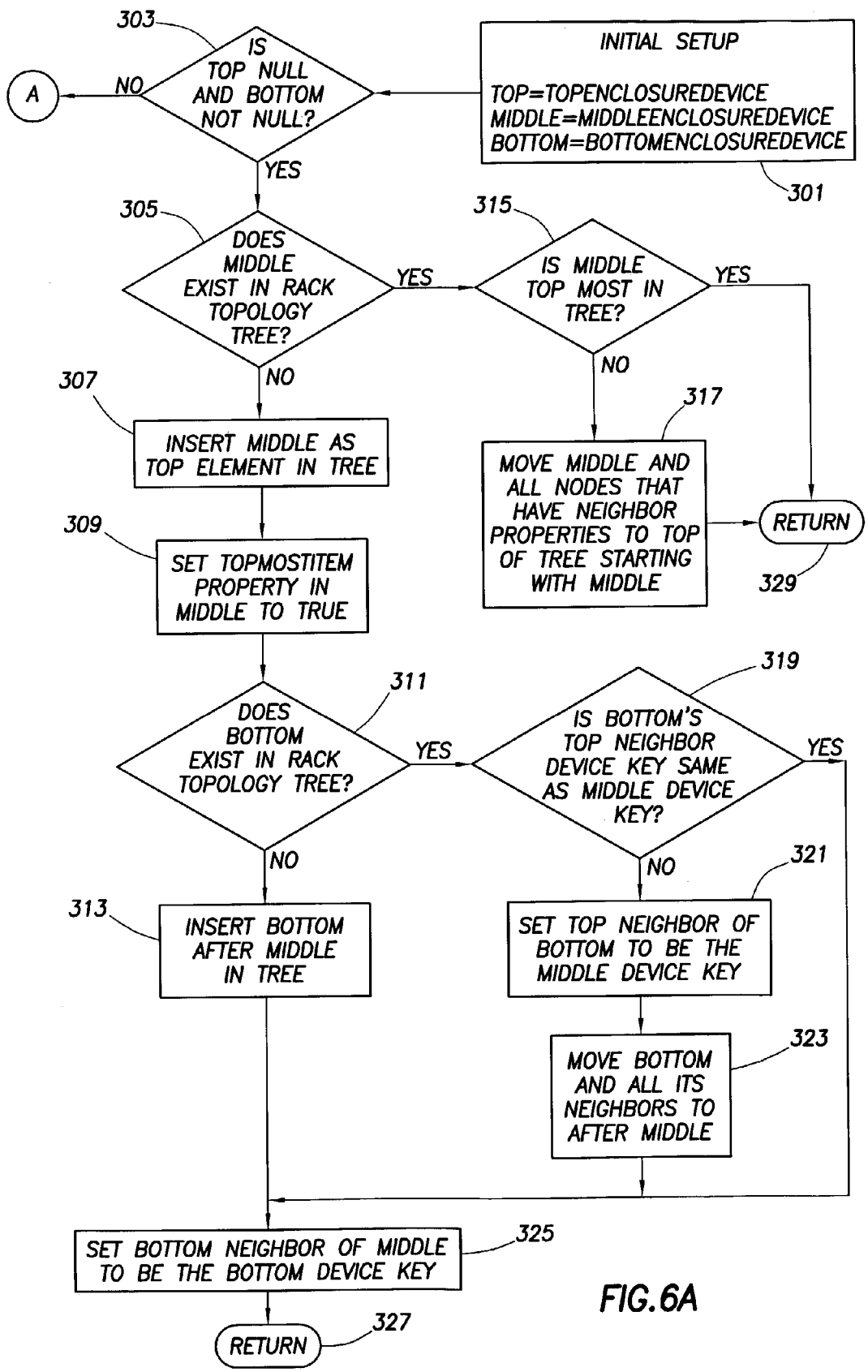
Figure 6B:
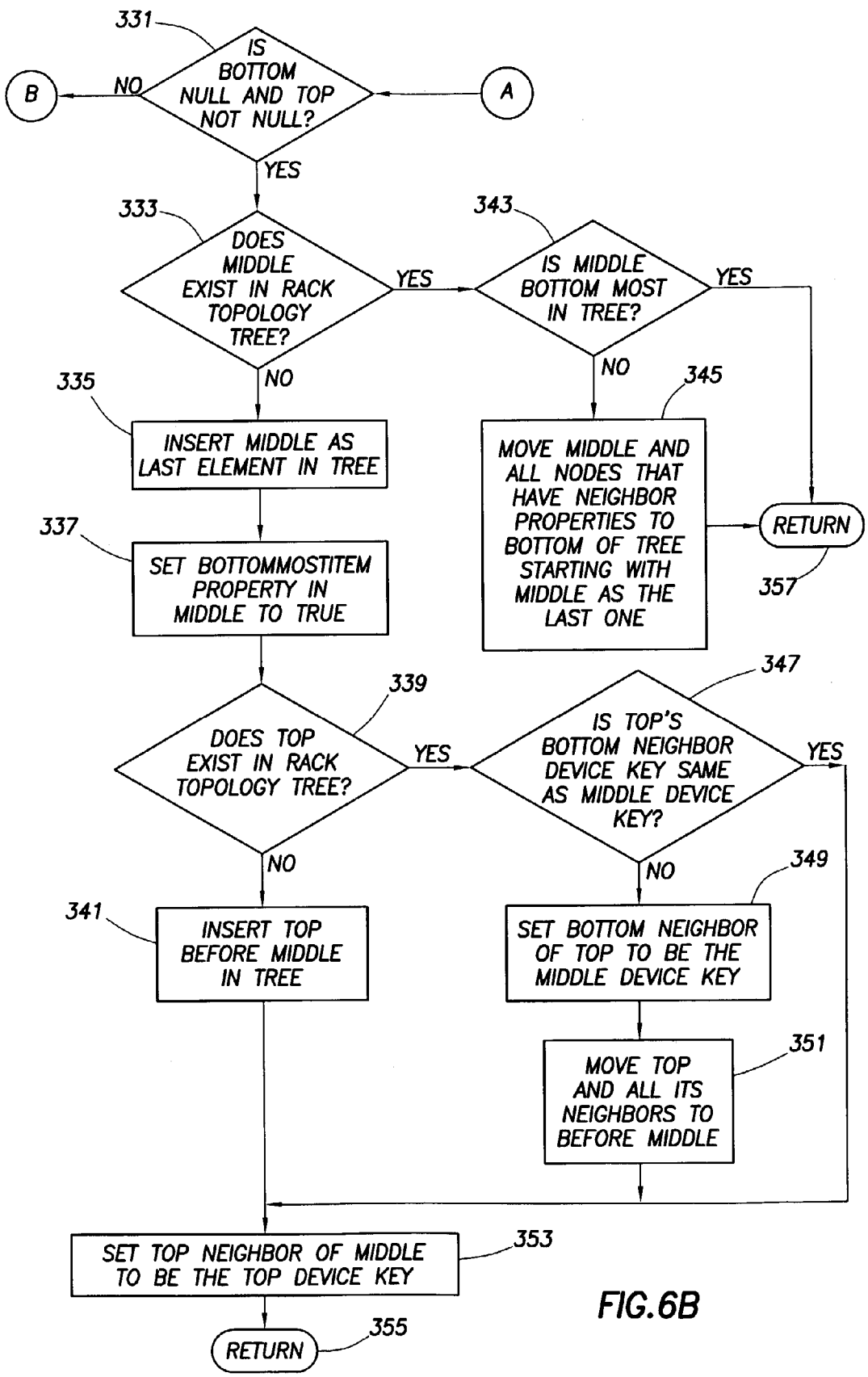

The remote device 200 obtains the system data (an exemplary form of which is provided in FIG. 5) from any one or more of the management processors in the system 100. When the system data information is received, the remote device 200 processes the data in such a way as to determine the physical configuration of the rack. FIGS. 6A–6C include portions of a flow chart that illustrate an exemplary process for analyzing the system data to determine the rack's topology. The process may be performed by RMA 230 in the remote device. The flowchart shows exemplary actions for determining where an enclosure is located in a rack relative to other enclosures in the rack. As system data is processed from each management processor, a topology file 232, or other mechanism, stored on the remote device's storage device 224, is updated to reflect the rack's physical configuration. FIGS. 6A–6C may refer to the physical configuration as a "tree" or "topology tree."

Referring to FIG. 6A, as indicated by block 301, references to "top," "middle," and "bottom" correspond to the enclosures identified in the exemplary XML listing 250 at 268, 263, and 270, respectively. Decision block 303 determines whether the top neighboring enclosure is "null" and the bottom neighboring enclosure is "not null" for the enclosure in question (i.e., the enclosure containing the management processor at address 263). "Null" refers to the absence of a device. If the answer is negative, control passes to A in FIG. 6B. However, if the answer to decision block 303 is "yes," then control passes to decision block 305 in which the question is answered as to whether the middle enclosure exists in the rack topology file 232. If the answer is "yes," control passes to decision block 315 in which it is determined whether the middle enclosure is the top-most enclosure in the rack topology. If the middle enclosure is, in fact, not the top-most enclosure in the topology of the rack, block 317 is performed in which the topology file is updated to reflect that the current enclosure is the top-most enclosure in the rack. At that point, the enclosure has been fully characterized in the topology tree and control returns at 329.

If, however, the middle enclosure does not already exist in the rack topology file 232, control passes to block 307 in which the middle enclosure is inserted into the file in such a way as to indicate that it is the "top" element in the topology. This designation as the "top" element may be supplanted subsequently if it is determined that, in fact, another enclosure is higher up in the rack than the current enclosure. In block 309, the value or flag "top most item" is set to true to indicate that the current enclosure has been set to be the top element in the topology. A "yes" answer to decision block 303 indicates that the current enclosure has a bottom neighbor enclosure. Decision block 311 determines whether the bottom enclosure already exists in the topology file 232. If the answer is "yes," control passes to decision block 319 in which it is determined whether the bottom's top neighbor "device key" is the same as the middle device key. "Device Key" refers to an internal identifier for the device electronic component. If the answer to that decision is "no," the top neighbor of bottom is set to be the middle device key in block 321, and in block 323 bottom and all of its neighbors are characterized in a topology file to be located after the middle enclosure. Control then passes to block 325 in which the bottom neighbor of the middle enclosure is set to be the bottom device key. If the answer to decision block 311 is "no," block 313 is performed in which the bottom enclosure is inserted after the middle enclosure in the topology file. Control passes to block 325 which performs the action stated above. Control returns in block 327.

Referring now to FIG. 6B, decision block 331 answers the question as to whether the bottom enclosure is null and the top enclosure is not null. If the answer to that decision is "no," control passes to B in FIG. 6C. Otherwise control passes to decision block 333, in which it is determined whether the middle enclosure already exists in the rack topology file. If the answer to that decision is "yes," control passes to decision block 343, in which it is determined whether the middle enclosure is the bottom most enclosure in the rack. If the answer is "no," the topology file 232 is updated to reflect that the middle enclosure is the bottom most enclosure in the rack and control returns at 357. Otherwise, if the middle enclosure is the bottom-most enclosure in the rack, control simply returns at 357.

If the middle enclosure does not already exists in the rack file 232 (as determined by decision block 333), block 335 is performed in which the middle enclosure is inserted as the last element in the topology tree. In block 337, a "bottom most item" property is set to a value of "true" and control passes to decision block 339. In decision block 339, it is determined whether the middle enclosure's top enclosure exists in the rack topology tree. If the answer is "yes," decision block 347 is performed, in which it is determined whether the top enclosure's bottom neighbor device key is the same as the middle enclosure device key. If the answer to that question is "no," blocks 349 and 351 are performed, in which the bottom neighbor of the top enclosure is set to be the middle device key, and the top enclosure and all of its neighbors are moved to be located before the middle enclosure in the topology tree, respectively. Control then passes to block 353 in which the top neighbor of the middle enclosure is set to be the top device key and control returns at 355. If, in decision block 347, the top enclosure's bottom-neighbor device key is the same as the middle device key, control passes to block 353. Referring briefly to previously discussed decision block 339, if the top enclosure does not already exist in the rack topology tree, block 341 is performed in which the top enclosure is inserted before the middle enclosure in the tree and control also passes to block 353 at that point.

Referring now to FIG. 6C, decision block 380 is performed, in which it is determined whether the top enclosure already exists in the rack topology tree. If the top enclosure does exist in the rack topology tree, block 394 is performed, in which it is determined whether the middle enclosure already exists in the rack topology tree. If the result of decision block 351 is "no," block 363 is performed, in which the middle enclosure is inserted after the top enclosure in the topology tree and control passes to decision block 365. Back at block 351, if the middle enclosure does exist in the rack topology tree, and after block 363 is performed, control passes to decision block 365 on which it is determined whether the bottom enclosure already exists in the rack topology tree. If the bottom enclosure does exist in the rack topology tree, then block 366 is performed, in which the bottom enclosure and all neighbors are moved to the middle enclosure. If the bottom enclosure does not exist in the rack topology tree, then the bottom enclosure is inserted into the tree after the middle enclosure (block 367). Following blocks 366 and 367, control passes to block 369, in which the bottom neighbor of the top enclosure is set to the middle device key, the top neighbor of the middle enclosure is set to the top device key, the bottom neighbor of the middle enclosure is set to the bottom device key, and the top neighbor of the bottom enclosure is set to the middle device key. Control then returns at block 371.

Going back to decision block 380, if the top enclosure does not exist in the rack topology tree, control passes to decision block 382 in which it is determined whether the middle enclosure exists in the rack topology tree. If the answer is "yes," control passes to block 392, in which the top enclosure is inserted before the middle enclosure in the rack topology tree, and control then passes to decision block 365 (described above). If the middle enclosure does not exist in the rack topology tree (as determined by decision block 341), control passes to decision block 384 in which it is determined whether the bottom enclosure exists in the rack topology tree. If the bottom enclosure does exist in the rack topology tree, block 355 is performed, in which the middle enclosure is inserted before the bottom enclosure, and the top enclosure is inserted before the middle enclosure in the topology tree. Control then flows to block 369. If the bottom enclosure does not exist in the rack topology tree (decision block 384), control passes to decision block 386.

In decision block 386, it is determined whether the rack topology tree includes "nodes." A node is tree terminology for an element in the tree. In this case, it represents an enclosure. If the topology tree does not include any nodes, then in block 357, the top, middle and bottom enclosures are inserted at the top of the rack topology tree, and control then passes to block 369. If the rack topology tree includes at least one node, then in block 388, it is determined whether the top most node in the tree has its "top most item" property set to a value of "true." If the top most item property value is set to "true," then decision block 359 is performed, in which it is determined whether the bottom most node in the tree has as its "bottom most item" property value set to "true." If the answer to decision block 359 is "yes," then block 360 is performed, in which a search is performed where top, middle, and bottom enclosures are inserted after an enclosure when no bottom neighbor is found. If the bottom-most node in the tree does not have its bottom most item property set to "true," then the top, middle and bottom enclosures are included in the rack topology tree at the bottom of the tree structure (block 361). If the top most node in the tree does not have its top most item property set to a value of "true" (decision block 388), the top, middle and bottom enclosures are inserted at the top of the rack topology tree in file 232. Following execution of blocks 360, 361 and 390, control passes to block 369.

Figure 8:
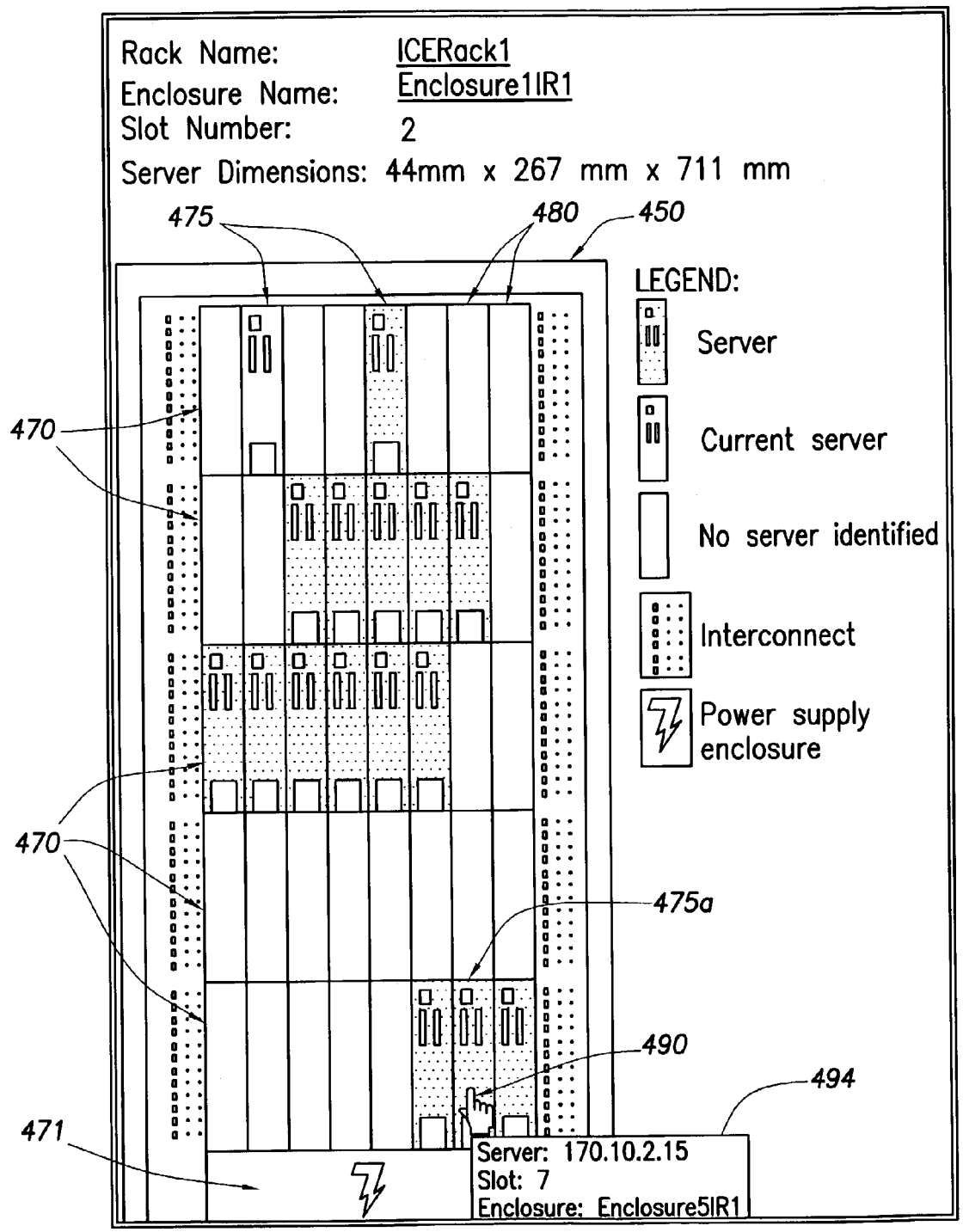
FIG. 8 illustrates how physical configuration information may be displayed on the remote device in accordance with embodiments of the invention.

Once RMA 230 (FIG. 4) is run to process the system data to determine the physical configuration of the components (e.g., servers, enclosures, etc.) in the support structure (rack), the resulting rack topology may be provided on the remote device's display 210. FIGS. 8 and 9 illustrate various embodiments of how the rack topology information may be provided on display 210.

Figure 7:
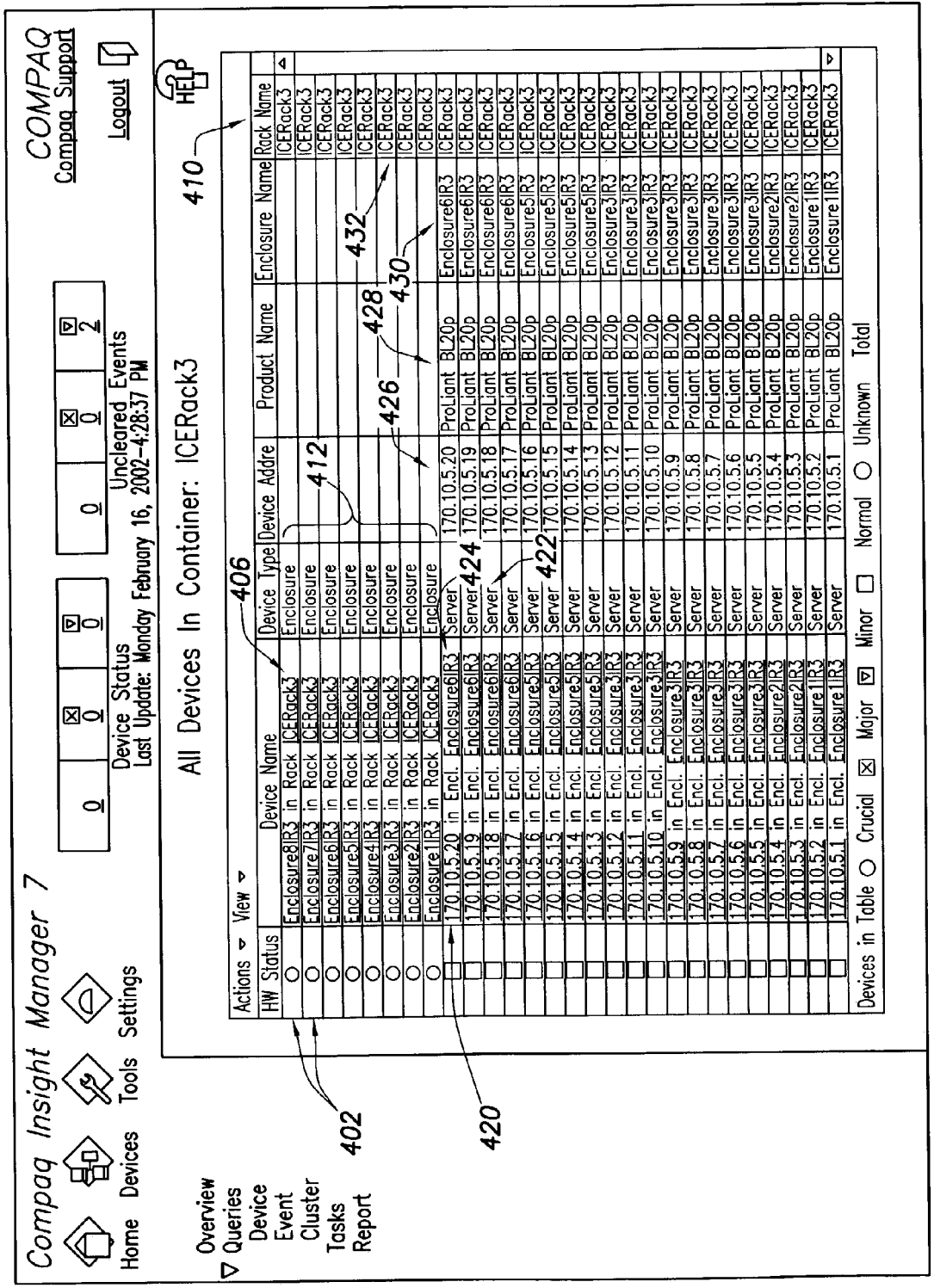
FIG. 7 illustrates how physical configuration information may be displayed on the remote device in accordance with embodiments of the invention.

Referring to FIG. 7, the topology may be provided in the form of a list of the various components in the rack. The example of FIG. 7 illustrates the use of a spreadsheet format for providing the topology information. Each row 402 in the spreadsheet may correspond to a component such as an enclosure, a device (e.g., a server) within enclosure, etc. For example, the first eight rows 412 in the exemplary spreadsheet of FIG. 7 correspond to eight enclosures. Each enclosure may be identified such as by the use of a device name 406 (e.g., Enclosure8IR3) as shown, as well as a device type (e.g., enclosure). The identity of the rack 410 in which the enclosure is located is also provided for each enclosure.

Referring still to FIG. 7, below the list of enclosures are the components contained in the various enclosures—one row 402 for each such component. For each component, any or all of the following information may be provided: device identity/name 420, an identity 422 of the enclosure in which the component is located, device type 424 (e.g., server), device address 426, product name 428, enclosure identity/name 430, and rack name 432. A user can manipulate the remote device's input device 222 to sort the topology information in accordance with any of the column headings (device name, device type, device address, product name, enclosure name, rack name). The screen view of FIG. 7 illustrates an embodiment of how the topology information may be provided to the user.

FIG. 8 illustrates the display of topology information on a remote device 200 in accordance with embodiments of the invention. The example of FIG. 8 may include a graphical image 450 of the support structure (e.g., rack) containing the various enclosures and components. The graphic image 450 of FIG. 8 may illustrate a rack which accommodates five enclosures 470 and one enclosure 471. In general, the enclosures 470, 471 contain one or more components. Enclosures 470 may accommodate eight components 475 (e.g., servers) and enclosure 471 may contain power supplies. Based on the system data analyzed via RMA 232, one or more of the slots in which components 475 could be inserted into an enclosure may remain unoccupied. Empty slots may be depicted by reference numeral 480. Graphic image 450 may provide a visual depiction of how the components are physically configured in the rack. This permits a user to determine any one or more of the following: whether the rack has empty slots 480 into which additional components can be installed, where a particular component is located within the rack, etc.

The user may move a pointer 490 on the remote device's display 210 using the input device 222. By moving the pointer over a component, such as component 475a, the RMA 232 may cause an information box 494 to be shown on or adjacent the graphic image 450. The text box 494 may contain information unique to the component 475a such as, without limitation, the component's address, slot number within the enclosure, enclosure name, etc.

The above discussion is meant to be illustrative of the principles and various embodiments of the present invention. Numerous variations and modifications will become apparent to those skilled in the art once the above disclosure is fully appreciated. For example, this disclosure and claims are not limited, unless otherwise stated, to racks containing servers. The rack may contain components other than servers. Further, the components may be contained in a support structure other than a rack. It is intended that the following claims be interpreted to embrace all such variations and modifications.

What is claimed is:

1. A computer, comprising:
   a CPU;
   a display coupled to said CPU;
   an interface coupled to said CPU and to a network and through which the computer can communicate with a support structure, wherein the support structure contains multiple components located therein and accommodates a plurality of enclosures in which the components are located; and
   a storage device containing an application that is executable by said CPU, said application causing said CPU to receive data from at least two components, said data includes information indicative of the location of at least one enclosure relative to another enclosure in the support structure and wherein the CPU determines the absolute locations of the enclosures based on the relative enclosure information;
   wherein said data also includes locations of at least some of said multiple components relative to one another in the support structure, and said application also causes said CPU to process the data to determine the absolute locations of said multiple components; and
   wherein a graphical depiction of the absolute locations is shown on said display, said graphical image depicting the Support structure and the location of said at least some of said multiple components within the support structure.

2. The computer of claim 1 wherein the support structure comprises a rack.

3. The computer of claim 1 wherein the components include at least one server.

4. The computer of claim 1 wherein the data received includes identity information pertaining to the enclosures.

5. The computer of claim 1 wherein the data further includes information indicative of the location of at least one component within an enclosure.

6. The computer of claim 1 wherein at least one component comprises a management processor included in a server located in an enclosure.

7. The computer of claim 1 wherein the computer receives data from each of said multiple components, the data received from each component comprises information indicative of the location of at least some of said multiple components.

8. The computer of claim 1 wherein a file is stored in the storage device containing information indicative of the location of the at least some of said multiple components.

9. A method, comprising:
   (a) receiving data from a single electrical component that is indicative of the relative location of a plurality of electrical components in a support structure; and
   (b) processing said data to determine the absolute location of the plurality of electrical components within the support structure;
   (c) displaying a graphical image of the support structure and the absolute locations of the plurality of electrical components within the support structure;
   wherein the support structure can accommodate a plurality of enclosures in which the components are located and (a) further includes receiving data that includes information indicative of the location of at least one enclosure relative to another enclosure in the support structure.

10. The method of claim 9 wherein (a) includes receiving data that includes identity information pertaining to the enclosures and components.

11. The method of claim 9 wherein (a) further includes receiving data indicative of the location of at least one component within an enclosure.

12. The method of claim 9 wherein the at least one component comprises a management processor included in a server located in an enclosure.

13. The method of claim 12 wherein (a) includes receiving data from each of said plurality of electrical components which is processed in (b).

14. The method of claim 9 further comprising displaying a graphical image that depicts the support structure and the location of the plurality of electrical components within the support structure.

* * * * *

UNITED STATES PATENT AND TRADEMARK OFFICE
CERTIFICATE OF CORRECTION

| | | |
|---|---|---|
| PATENT NO. | : 7,142,416 B2 | Page 1 of 1 |
| APPLICATION NO. | : 10/324547 | |
| DATED | : November 28, 2006 | |
| INVENTOR(S) | : Kalpana Subbarao et al. | |

It is certified that error appears in the above-identified patent and that said Letters Patent is hereby corrected as shown below:

In column 12, line 27, in Claim 1, delete "Support" and insert -- support --, therefor.

Signed and Sealed this

Thirty-first Day of March, 2009

JOHN DOLL
*Acting Director of the United States Patent and Trademark Office*